United States Patent
Murakami et al.

(10) Patent No.: US 7,630,951 B2
(45) Date of Patent: Dec. 8, 2009

(54) METHOD, PROGRAM PRODUCT, AND APPARATUS FOR GENERATING ANALYSIS MODEL

(75) Inventors: Tomoko Murakami, Kanagawa (JP); Hideki Kobayashi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 446 days.

(21) Appl. No.: 11/650,934

(22) Filed: Jan. 9, 2007

(65) Prior Publication Data

US 2007/0233632 A1     Oct. 4, 2007

(30) Foreign Application Priority Data

Mar. 17, 2006     (JP) .............. 2006-075696

(51) Int. Cl.
*G06F 9/44* (2006.01)
*G06N 7/02* (2006.01)
*G06N 7/06* (2006.01)

(52) U.S. Cl. ..................... 706/52
(58) Field of Classification Search ............... 706/52
See application file for complete search history.

(56) References Cited

U.S. PATENT DOCUMENTS

| | | | | |
|---|---|---|---|---|
| 6,232,974 B1 * | 5/2001 | Horvitz et al. | ............... | 345/419 |
| 6,574,537 B2 * | 6/2003 | Kipersztok et al. | ............ | 701/29 |
| 6,954,745 B2 * | 10/2005 | Rajan | ......................... | 706/22 |
| 7,010,483 B2 * | 3/2006 | Rajan | ......................... | 704/228 |
| 7,035,790 B2 * | 4/2006 | Rajan | ......................... | 704/201 |
| 7,072,833 B2 * | 7/2006 | Rajan | ......................... | 704/233 |
| 7,242,793 B2 * | 7/2007 | Trobaugh et al. | ........... | 382/128 |
| 7,430,475 B2 * | 9/2008 | Imoto et al. | .................. | 702/19 |
| 7,454,393 B2 * | 11/2008 | Horvitz et al. | ............... | 706/46 |
| 7,516,113 B2 * | 4/2009 | Horvitz et al. | ............... | 706/46 |

FOREIGN PATENT DOCUMENTS

JP     2005-107747     4/2005

OTHER PUBLICATIONS

2-D Software Quality Model and Case Study in Software Flexibility Research Li Zhang; Lin Li; Hui Gao; Computational Intelligence for Modelling Control & Automation, 2008 International Conference on Dec. 10-12, 2008 pp. 1147-1152 Digital Object Identifier 10.1109/CIMCA.2008.70.*

* cited by examiner

*Primary Examiner*—Michael B Holmes
(74) *Attorney, Agent, or Firm*—Finnegan, Henderson, Farabow, Garrett & Dunner, L.L.P.

(57) ABSTRACT

The present invention provides an analysis model generating method for generating an analysis model expressed using a Bayesian network. A analysis model generating method includes selecting a child variable to be added to the analysis model; selecting a plurality of variable candidates to be added to the analysis model as parent variables in causal relationships with the child variable; judging whether each of values indicating the causal relationships between the selected variable candidates and the child variable is high or low, based on the causal relationships between the variable candidates and the child variable; generating an aggregated variable different from the variable candidates by aggregating a plurality of low causal variable candidates; and putting high causal variable candidate and the aggregated variable into the analysis model as the parent variables to the child variable.

9 Claims, 10 Drawing Sheets

```
REFRIGERATOR CONSUMER QUESTIONNAIRE

Q1    YOU ARE
      OPTIONS:
      1. MALE        2. FEMALE

Q2    WHAT FACTORS ARE IMPORTANT FOR YOU WHEN YOU PURCHASE A
      REFRIGERATOR? (YOU MAY CHOOSE MORE THAN ONE.)
      OPTIONS:
      1. FUNCTIONS
      2. ENERGY SAVING FEATURES AND ECONOMIC EFFICIENCY
      3. SAFETY
      4. PRODUCT RELEASE DATE
      5. DESIGN
      6. SIZE
      7. PRICE
      8. WHETHER PRODUCT IS IN HIGH DEMAND
      9. REPUTATION
      10. REPAIR SERVICE PROVIDER
      11. BRAND NAME

Q3    HAVE YOU PURCHASED A REFRIGERATOR FROM "T" COMPANY?
      OPTIONS:
      1. YES  2. NO
```

```
<Network>
nodeName:    FEMALE, FUNCTIONS, ENERGY SAVING FEATURES, PRICE, REPUTATION, ...BRAND NAME,
             RESPONSE FREQUENCY←NODES THAT ARE PRESENT IN NETWORK
rootName:    FEMALE, FUNCTIONS←ROOT NODES THAT ARE PRESENT IN NETWORK
<Network>

<Node>
Name:   FEMALE                    →NODE NAME
Value:  YES, NO                   →NODE VALUE
Parent:                           →PARENT NODE NAME
Child:  RESPONSE FREQUENCY        →CHILE NODE NAME
<Node>

<Node>
Name:   RESPONSE FREQUENCY
Value:  HIGH, NORMAL, LOW
Parent: FEMALE
Child:  PURCHASED
<Node>

...

<Node>
Name:   FUNCTIONS
Value:  YES, NO
Parent:
Child:  PURCHASED
<Node>

<Node>
Name:   PURCHASED
Value:  YES, NO
Parent: FUNCTIONS, PRICE, BRAND NAME, RESPONSE FREQUENCY
Child:
<Node>
```

FIG.10

(FEMALE=YES)→0.51,
(FEMALE=NO)→0.49, (FUNCTIONS=YES)→0.87,
(FUNCTIONS=NO)→0.13, (FEMALE=YES)→(RESPONSE FREQUENCY=HIGH)→0.46,(RESPONSE FREQUENCY=NORMAL)→
0.38,(RESPONSE FREQUENCY=LOW)→0.16,
(FEMALE=NO)→0.13,(RESPONSE FREQUENCY=HIGH)→0.21,(RESPONSE FREQUENCY=NORMAL)→
0.42,(RESPONSE FREQUENCY=LOW)→0.37,

: :

(FUNCTIONS=YES&PRICE=YES&BRAND NAME=YES&RESPONSE FREQUENCY=HIGH)→(PURCHASED=YES)→
0.801654,(PURCHASED=NO)→0.198346
(FUNCTIONS=YES&PRICE=YES&BRAND NAME=NO&RESPONSE FREQUENCY=HIGH)→(PURCHASED=YES)→
0.66672,(PURCHASED=NO)→0.33328
(FUNCTIONS=YES&PRICE=YES&BRAND NAME=NO&RESPONSE FREQUENCY=NORMAL)→(PURCHASED=YES)→
0.647806,(PURCHASED=NO)→0.358294
(FUNCTIONS=NO&PRICE=YES&BRAND NAME=NO&RESPONSE FREQUENCY=LOW)→(PURCHASED=YES)→
0.85786,(PURCHASED=NO)→0.1432987

: :

(FUNCTIONS=NO&PRICE=NO&BRAND NAME=NO&RESPONSE FREQUENCY=LOW)→(PURCHASED=YES)→
0.3593759,(PURCHASED=NO)→0.6406241

FIG.11

METHOD, PROGRAM PRODUCT, AND APPARATUS FOR GENERATING ANALYSIS MODEL

CROSS-REFERENCE TO RELATED APPLICATIONS

This application is based upon and claims the benefit of priority from the prior Japanese Patent Application No. 2006-75696, filed on Mar. 17, 2006; the entire contents of which are incorporated herein by reference.

BACKGROUND OF THE INVENTION

1. Field of the Invention

The present invention relates to an analysis model generating method, an analysis model generation program product, and an analysis model generating apparatus for generating, as a Bayesian network, an analysis model that shows causal relationships between variables.

2. Description of the Related Art

Conventionally, a Bayesian network is known as a method for expressing causal relationships between variables in a model. For example, it is possible to generate, as a Bayesian network, a decision-making model of respondents from questionnaire data.

To generate the decision-making model of the respondents from the questionnaire data, the methods for determining the structure of the model that are generally known include a method in which the question items in the questionnaire are directly reflected in the model and a method in which the K2 algorithm is used. For example, a method for determining the structure of a decision-making model, using the K2 algorithm has been disclosed. (For example, see JP-A 2005-107747 (KOKAI).)

However, when the method for determining the model structure mentioned above is used, the factors in the decision-making process of the respondents are not necessarily clear before the questionnaire survey is conducted. Thus, before the questionnaire survey is actually conducted, it is necessary to prepare all the elements that each have a possibility of being a factor of the decision-making process as the question items in the questionnaire. As a result, in many situations, the number of question items tends to become large.

When such a large number of question items in the questionnaire are directly introduced into a model, the model will have a large number of parameters. As a result, a large volume of data is needed for generating a reliable model, and thus this method is not very realistic.

To solve this problem, it is acceptable to select only variables having a strong causal relationship, using the K2 algorithm, and to introduce important question items in the questionnaire into a decision-making model. However, this method also has a problem because there is a possibility of missing information that is included in some question items in the questionnaire that have a weak causal relationship and have not been introduced into the decision-making model.

SUMMARY OF THE INVENTION

According to one aspect of the present invention, an analysis model generating method for generating an analysis model in which causal relationships between variables are expressed using a Bayesian network, the method includes selecting a child variable to be added to the analysis model; selecting a plurality of variable candidates to be added to the analysis model as parent variables in causal relationships with the child variable; judging whether each of values indicating the causal relationships between the selected variable candidates and the child variable is high or low, based on the causal relationships between the variable candidates and the child variable; generating an aggregated variable different from the variable candidates by aggregating a plurality of low causal variable candidates, each of the low causal variable candidates being judged to have a low value in indicating the causal relationship; and putting high causal variable candidate and the aggregated variable into the analysis model as the parent variables to the child variable, the high causal variable candidate being judged to have a high value in indicating the causal relationship.

According to another aspect of the present invention, an analysis model generating apparatus for generating an analysis model in which causal relationships between variables are expressed using a Bayesian network, the apparatus includes a child variable selecting unit that selects a child variable to be added to the analysis model; a variable candidate selecting unit that selects a plurality of variable candidates to be added to the analysis model as parent variables in causal relationships with the child variable; a causal relationship judging unit that judges whether each of values indicating the causal relationships between the selected variable candidates and the child variable is high or low, based on the causal relationships between the variable candidates and the child variable; an aggregated variable generating unit that generates an aggregated variable different from the variable candidates by aggregating a plurality of low causal variable candidates, each of the low causal variable candidates being judged to have a low value in indicating the causal relationship; and a parent variable determining unit that puts high causal variable candidate and the aggregated variable into the analysis model as the parent variables to the child variable, the high causal variable candidate being judged to have a high value in indicating the causal relationship.

A computer program product according to still another aspect of the present invention causes a computer to perform the method according to the present invention.

DETAILED DESCRIPTION OF THE INVENTION

Exemplary embodiments of the analysis model generating method, the analysis model generating program, and the analysis model generating apparatus according to the present invention will be explained in detail, with reference to the drawings. The present invention is not limited to these exemplary embodiments.

Figure 1:
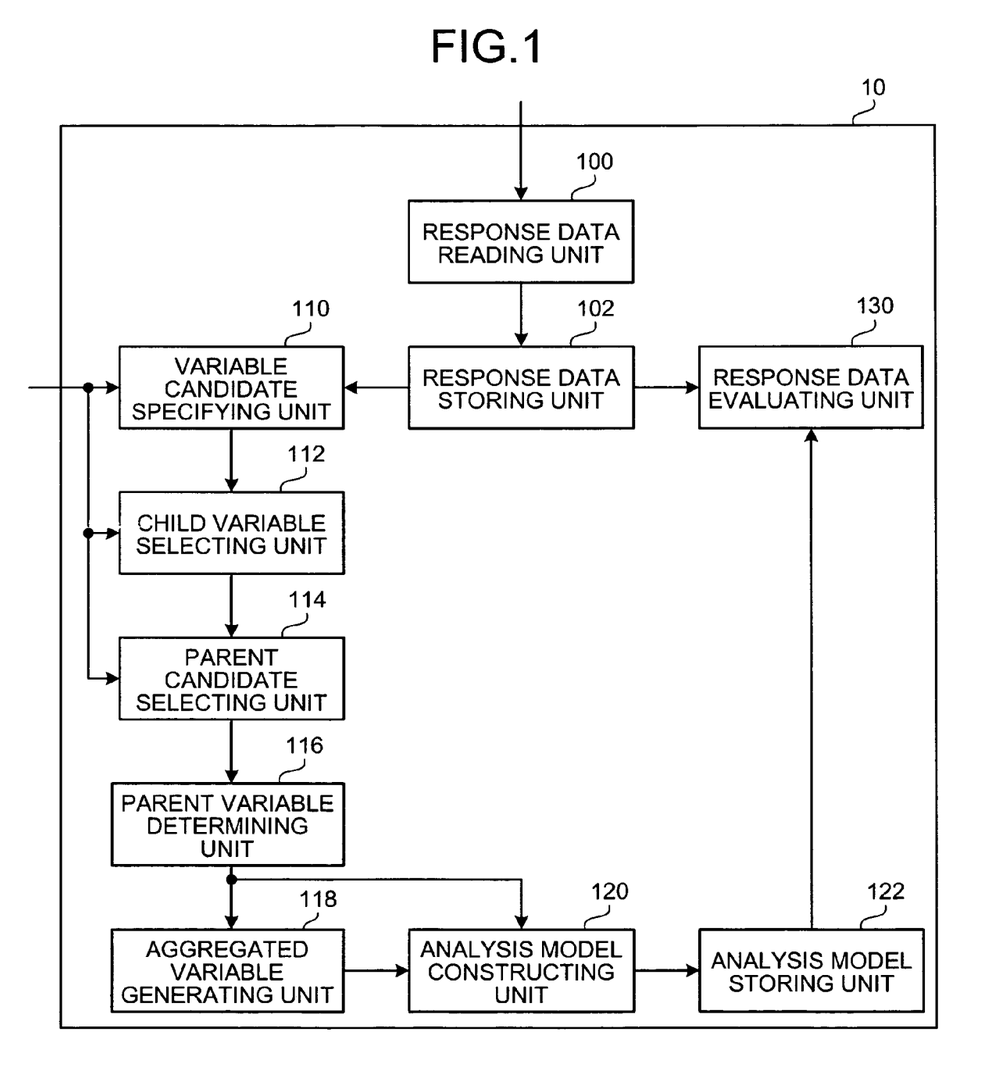
FIG. 1 is a block diagram of the functional configuration of an analysis model generating apparatus according to an embodiment of the present invention.

FIG. 1 is a block diagram of the functional configuration of an analysis model generating apparatus 10 according to an embodiment of the present invention. The analysis model generating apparatus 10 is an apparatus that constructs, as an analysis model, a purchase decision-making model of questionnaire respondents, based on questionnaire response data collected in a survey on consumers' purchase intentions. To be more specific, the analysis model generating apparatus 10 determines a model structure. The purchase decision-making model is a structure model using a Bayesian network and is constructed based on causal relationships between variables and the like.

Analysis models that are the generation targets of the analysis model generating apparatus 10 are not limited to the one based on the questionnaire response data collected in a survey on consumers' purchase intentions. It is possible to perform an analysis based on not only the questionnaire response data, but also a plurality of elements that can be expressed with variables. It is acceptable to use any data as long as it is possible to analyze the data in a structure model using a Bayesian network.

The analysis model generating apparatus 10 includes a response data reading unit 100, a response data storing unit 102, a variable candidate specifying unit 110, a child variable selecting unit 112, a parent candidate selecting unit 114, a parent variable determining unit 116, an aggregated variable generating unit 118, an analysis model constructing unit 120, an analysis model storing unit 122, and a response data evaluating unit 130.

The response data reading unit 100 reads the response data in the questionnaire survey. The response data storing unit 102 stores therein the response data obtained by the response data reading unit 100. The variable candidate specifying unit 110 specifies variable candidates out of the response data stored in the response data storing unit 102. In this situation, the variable candidates are variables each of which has a possibility of being included in the analysis model of the response data. The variable candidate specifying unit 110 may specify the variable candidates according to an instruction from a user. For example, when the variables that are expected to be necessary in a purchase decision-making model are projected in advance by a professional or the like, these variables are specified as the variable candidates by the user.

For example, the instruction from the user may be obtained as being input by the user through a keyboard. As other examples, the instruction from the user may be input on-line through a network, or may be read from a magnetic tape that is used as an information transfer medium.

Figure 2:
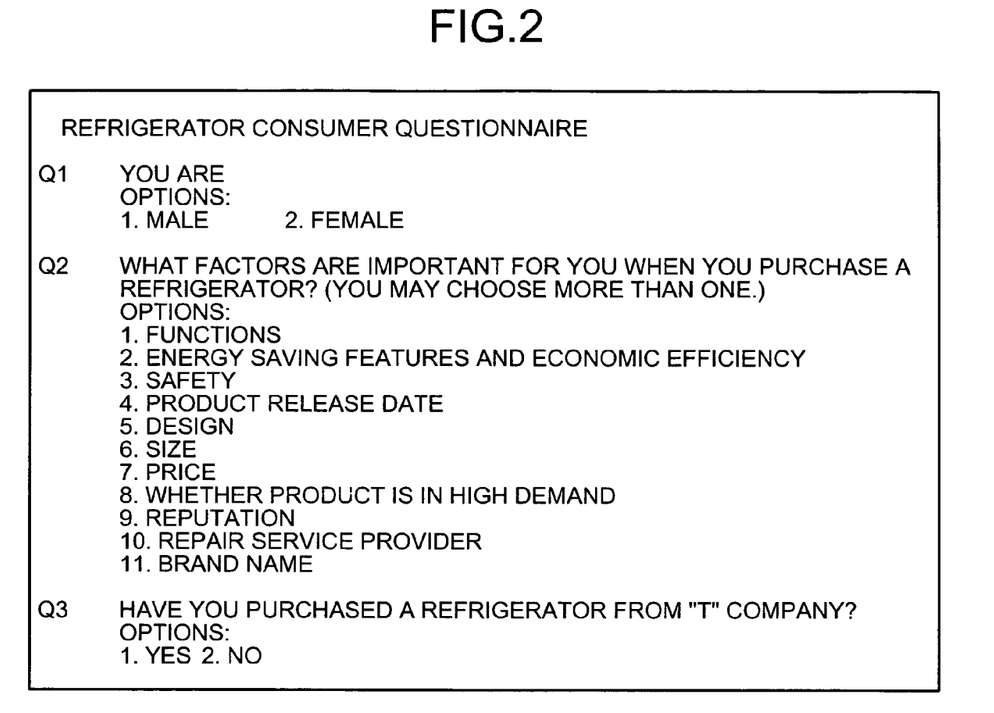
FIG. 2 is a drawing of an example of response data.

FIG. 2 is a drawing of an example of the response data. As shown in FIG. 2, the target data used by the analysis model generating apparatus 10 includes a plurality of option items for each question item. The variable candidate specifying unit 110 specifies these items as the variable candidates. In the example shown in FIG. 2, for the question "Q2", for example, the option items such as "functions" and "energy-saving features and economic efficiency" are specified as the variable candidates.

The child variable selecting unit 112 selects a child variable out of the variable candidates specified by the variable candidate specifying unit 110. The child variable is selected according to an instruction from the user. As another example, each of the variable candidates that have been selected by the variable candidate specifying unit 110 may be sequentially selected as a child variable in an arbitrary order. The parent candidate selecting unit 114 selects parent candidates each of which has a possibility of being a parent variable that is in a parent-children relationship with the child variable selected by the child variable selecting unit 112. The parent variable candidates are selected according to an instruction from the user.

The parent variable determining unit 116 classifies the parent candidates into a group of high causal parent candidates that each have a strong causal relationship and a group of low causal parent candidates that each have a weak causal relationship, based on the causal relationships between the child variable and the parent candidates in the response data. The parent variable determining unit 116 then determines that the variables that have been classified into the group of high causal parent candidates are the parent variables. The aggregated variable generating unit 118 newly generates an aggregated variable by aggregating the parent candidates that have been classified into the group of low causal parent candidates by the parent variable determining unit 116.

The analysis model constructing unit 120 constructs an analysis model that includes the parent variables that have been determined by the parent variable determining unit 116 and the aggregated variable that has been generated by the aggregated variable generating unit 118. The analysis model constructing unit 120 reflects the selected parent variables and the aggregated variable to each child variable so as to complete the analysis model. The analysis model storing unit 122 stores therein the analysis model. The response data evaluating unit 130 analyzes the response data stored in the response data storing unit 102, using the analysis model stored in the analysis model storing unit 122.

Figure 3:
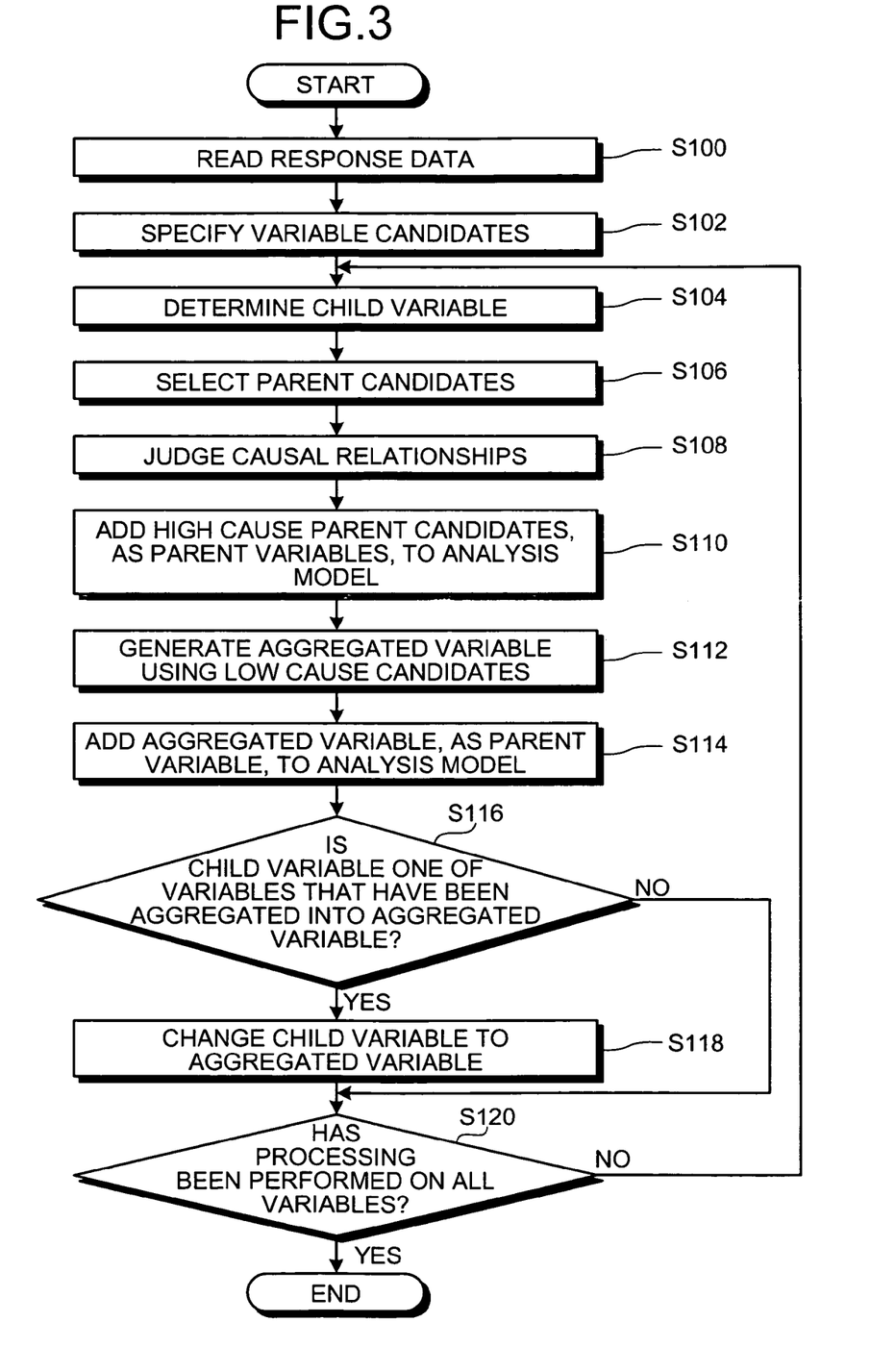
FIG. 3 is a flow chart of an analysis model generating process performed by the analysis model generating apparatus.

FIG. 3 is a flow chart of the analysis model generating process performed by the analysis model generating apparatus 10. Firstly, the response data reading unit 100 reads the response data and stores the read data into the response data storing unit 102 (step S100). Next, the variable candidate specifying unit 110 specifies variable candidates (step S102). It should be noted that, in the response data, the portions that correspond to the responses to the questions are specified as the variable candidates. The variables that are specified as the variable candidates are defined according to the type of data that is used as the analysis target. In other words, the variable candidates are selected, based on the information related to the variables that are included in the data used as the analysis target.

Subsequently, the child variable selecting unit 112 selects a child variable (step S104). Next, the parent candidate selecting unit 114 selects parent candidates (step S106). The parent variable determining unit 116 then judges the values indicating the causal relationships between the parent candidates and the child variable, based on the causal relationships between the parent candidates and the child variable (step S108). To be more specific, when the value indicating the causal relationship is equal to or larger than a predetermined threshold value, the parent candidate is judged to be a high causal parent candidate, whereas when the value indicating the causal relationship is smaller than the threshold value, the parent candidate is judged to be a low causal parent candidate. For example, the K2 algorithm may be used in this judgment process.

Next, the parent variable determining unit 116 determines that the high causal parent candidates are the parent variables. The analysis model constructing unit 120 adds the high causal parent candidates to the analysis model as the parent variables of the child variable selected by the child variable selecting unit 112 (Step S110). Subsequently, the aggregated variable generating unit 118 newly generates an aggregated variable by aggregating the low causal parent candidates (step S112). Next, the aggregated variable is added to the analysis model as the parent variable of the child variable selected by the child variable selecting unit 112 (step S114). The low causal parent candidates are deleted, without being added to the analysis model.

As explained above, by deleting the low causal parent candidates, it is possible to narrow down the target of the analysis processing and thereby to perform the processing efficiently. On the other hand, if the low causal parent candidates include some important information that is not directly reflected in the causal relationships, there is a possibility that an appropriate analysis cannot be performed because such important information is missing. Thus, by aggregating the low causal parent candidate into the one aggregated variable, as described above, it is possible to take the information included in all of the low causal parent candidates into account. Further, even if there are a large number of low causal parent candidates, these low causal parent candidates are aggregated into one aggregated variable. Thus, it is possible to avoid the situation where the processing efficiency is lowered by the processing to take the low causal parent candidates into account.

Subsequently, it is checked whether the child variable selected by the child variable selecting unit 112 is one of the variables that are aggregated into the aggregated variable. For example, when the variable candidates that are specified by the variable candidate specifying unit 110 have a hierarchical structure, the processing explained above is recursively performed on each of the hierarchy levels. To be more specific, for a child variable in the first hierarchy level, the parent variables are specified from the second hierarchy level. Subsequently, using a variable in the second hierarchy level as a child variable, the parent variables are specified from the third hierarchy level. This processing is repeated up to the highest hierarchy level.

In this processing, it is assumed that a child variable in a given hierarchy level has been deleted when the child variable is processed as the parent candidate of another child variable in the lower hierarchy level, and an aggregated variable has been generated. In this situation, the child variable in the given hierarchy level is judged to be one of the variables that have been aggregated into the aggregated variable (step S116: Yes). In this situation, the causal relationship between the child variable and the parent variable of the child variable determined by the parent variable determining unit 116 is changed to the causal relationship between the aggregated variable generated from the child variable and the parent variable (step S118). In other words, the child variable is changed to the aggregated variable. The processing described so far is performed on each of all the variables (step S120: Yes), and thus the processing is completed. When the variables are in a hierarchical structure as described above, the processing at steps S104 through S118 is recursively repeated, sequentially from the lower hierarchy levels.

Figure 4:
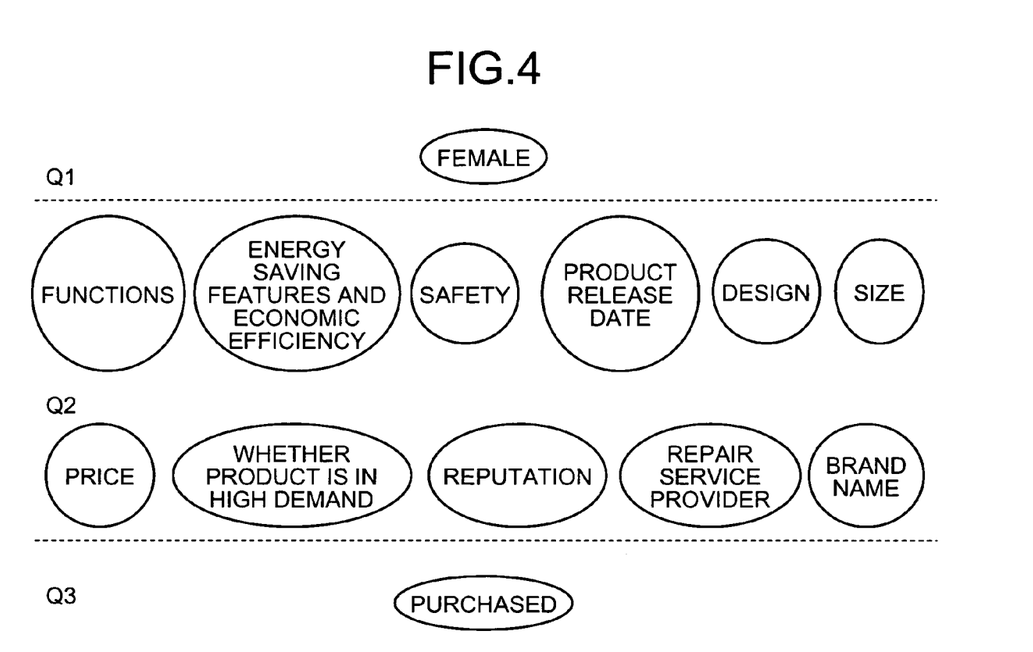
FIG. 4 is a drawing of variable candidates that are specified, at step S102, out of the response data shown in FIG. 2.

Next, the analysis model generating process to generate the analysis model for the result of the questionnaire shown in FIG. 2 will be specifically explained with reference to FIG. 4 through FIG. 10. FIG. 4 is a drawing of the variable candidates that are specified, at step S102, out of the response data shown in FIG. 2. For the question "Q1", "Female" is specified as the variable candidate. For the question "Q2", all the options for the question "Q2", namely "functions", "energy saving features and economic efficiency", "safety", "product release date" and so on, are specified as the variable candidates. For the question "Q3", "purchased" that corresponds to the option "Yes" is specified as the variable candidate.

Figure 5:
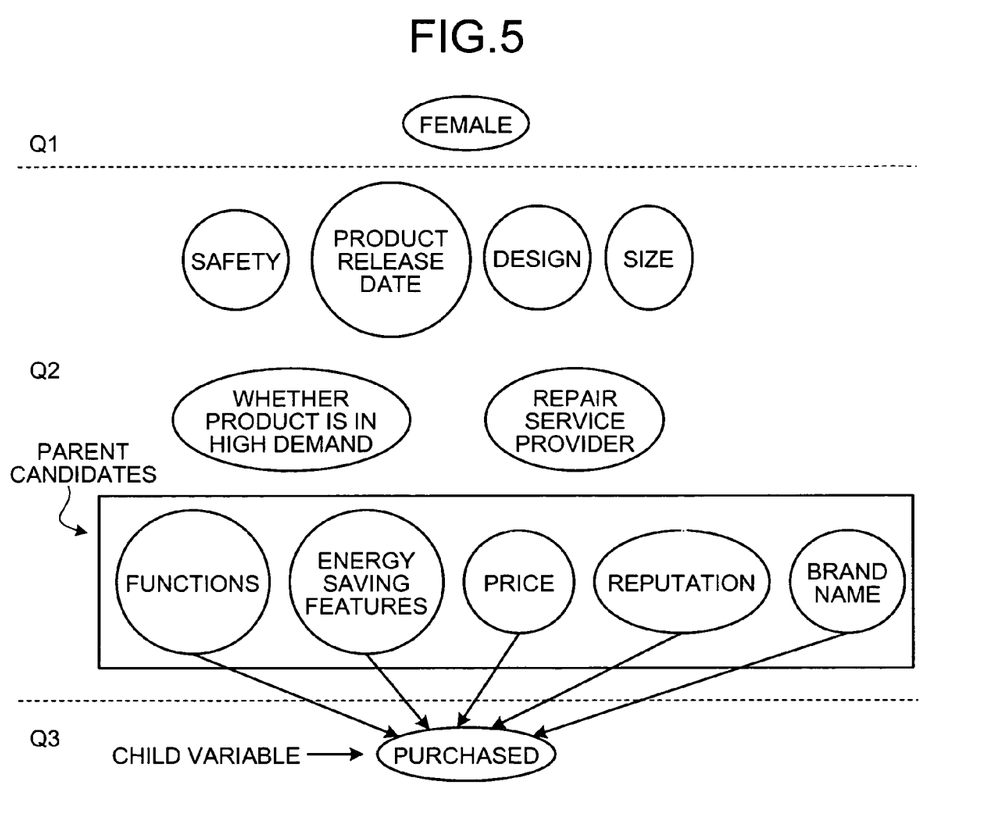
FIG. 5 is a drawing of a child variable and parent candidates.

Out of these variable candidates, "purchased" is selected as the child variable (step S104). Further, predetermined ones of the option items for the question "Q2" are selected as the parent candidates (step S106). FIG. 5 is a drawing of the child variable and the parent candidates. In this example, only a part of the option items for the question "Q2" are selected as the parent candidates. This selection is made based on, for example, opinions of a professional, or the statistical results in the past. It is acceptable to select variables that are each in a strong causal relationship with the child variable "purchased" as the parent candidates, like in this example.

Any one of the option items for the question "Q2" can be a parent variable of the child variable. Thus, as an alternative method, it is also acceptable to select all of the option items for the question "Q2" as the parent candidates.

Figure 6:
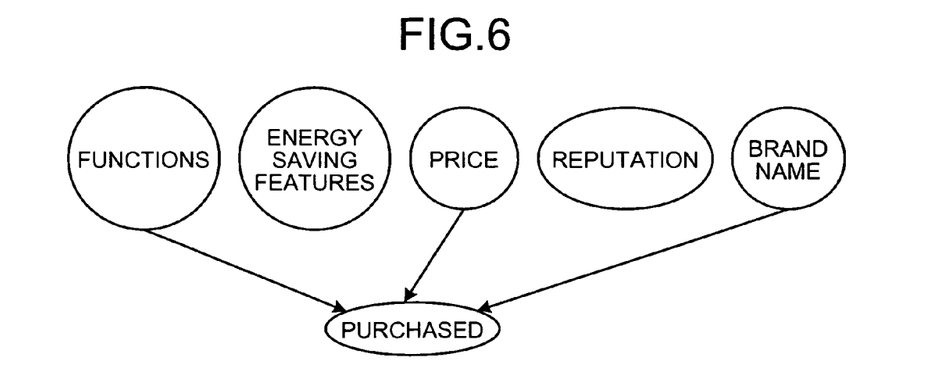
FIG. 6 is a drawing for explaining a process performed on high causal parent candidates.

Next, for each of all the parent candidates shown in FIG. 5, the causal relationship is judged (step S108). FIG. 6 is a drawing for explaining the process performed on the high causal parent candidates. In the example shown in FIG. 6, "functions", "price", and "brand name" are selected as the high causal parent candidates. In this situation, these high causal parent candidates are added to the analysis model as the parent candidates (step S110). Further, as shown in FIG. 6, the causal relationships between the parent variables and the child variable are described.

Figure 7:
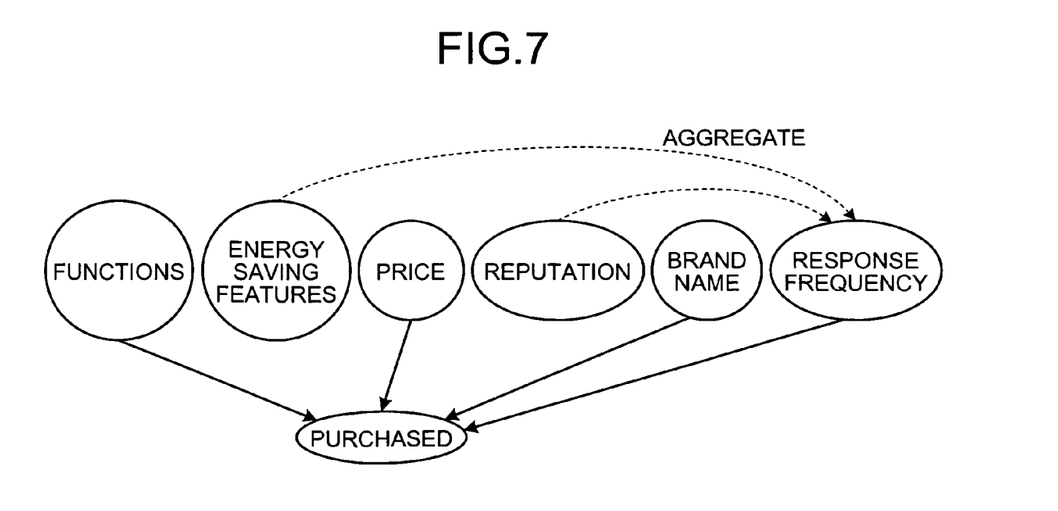
FIG. 7 is a drawing for explaining a process performed on low causal parent candidates.

FIG. 7 is a drawing for explaining the process performed on the low causal parent candidates. In the example shown in FIG. 7, "energy saving features" and "reputation" are selected as the low causal parent candidates. These variables are aggregated so as to generate an aggregated variable (step S112). The aggregated variable in the present example is "response frequency" that indicates the number of times "energy saving features" and "reputation" are selected. As the variable values for "response frequency", three levels may be set, for example: 'High (both "energy saving features" and "reputation" are selected)'; 'Normal (one of the two is selected)'; and 'Low (neither of the two is selected)'.

When the causal relationship with whether the product has been purchased or not is taken into account, like in the present example, the response frequency is an important factor. People who have purchased the product are expected to be highly interested in commercial products and the like, and also expected to show a high response frequency level. The reason is because whether the consumer has purchased the product or not has relationship with the response frequency. However, if these variables are judged to be low causal parent variables ("energy saving features" and "reputation" in the present example) and deleted in the causal relationship judgment processing, it is not possible to take the causal relationship between these factors and purchasing into account.

On the contrary, by newly generating the aggregated variable with the factor of response frequency, like in the present example, it is possible to generate an analysis model in which the low causal parent variables are also taken into account. Further, because all the low causal parent variables are put together into one aggregated variable, it is possible to avoid lowering the processing efficiency. In other words, it is possible to take also the variables having weak causal relationships into account, and also to generate an analysis model that has high processing efficiency.

Figure 8:
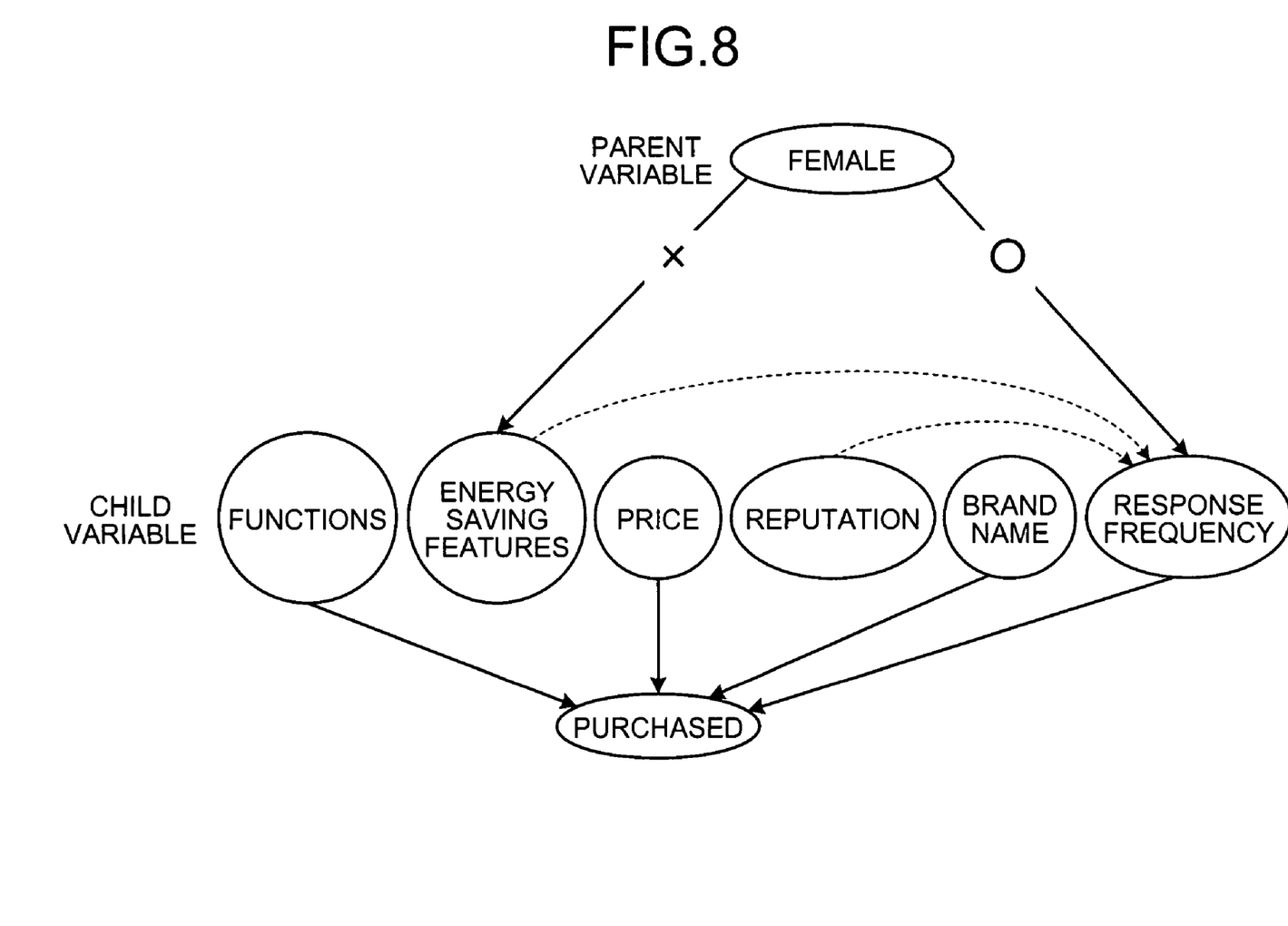
FIG. 8 is a drawing of the relationship between child variables and an aggregated variable.

FIG. 8 is a drawing for explaining the relationship between the child variables and the aggregated variable. The situation where the processing performed on the child variable "purchased" has finished, and the "energy saving features" has newly been selected as a child variable will be explained. At this time, it is assumed that "Female" has been selected as the parent candidate and judged to be a high causal parent candidate. In this situation, "Female" is determined as the parent variable, and the causal relationship between "Female" and "energy saving features" is described. However, "energy saving features" has been deleted during the processing performed on the child variable "purchased", and has been aggregated into the aggregated variable "response frequency". When a child variable has been aggregated into an aggregated variable like in this example, in other words, when a child variable is one of the variables that have been aggregated into an aggregated variable, the causal relationship between the parent variable and the aggregated variable is described. In the example shown in FIG. 8, the causal relationship between the parent variable "Female" and the aggregated variable "response frequency" is described.

Figure 9:
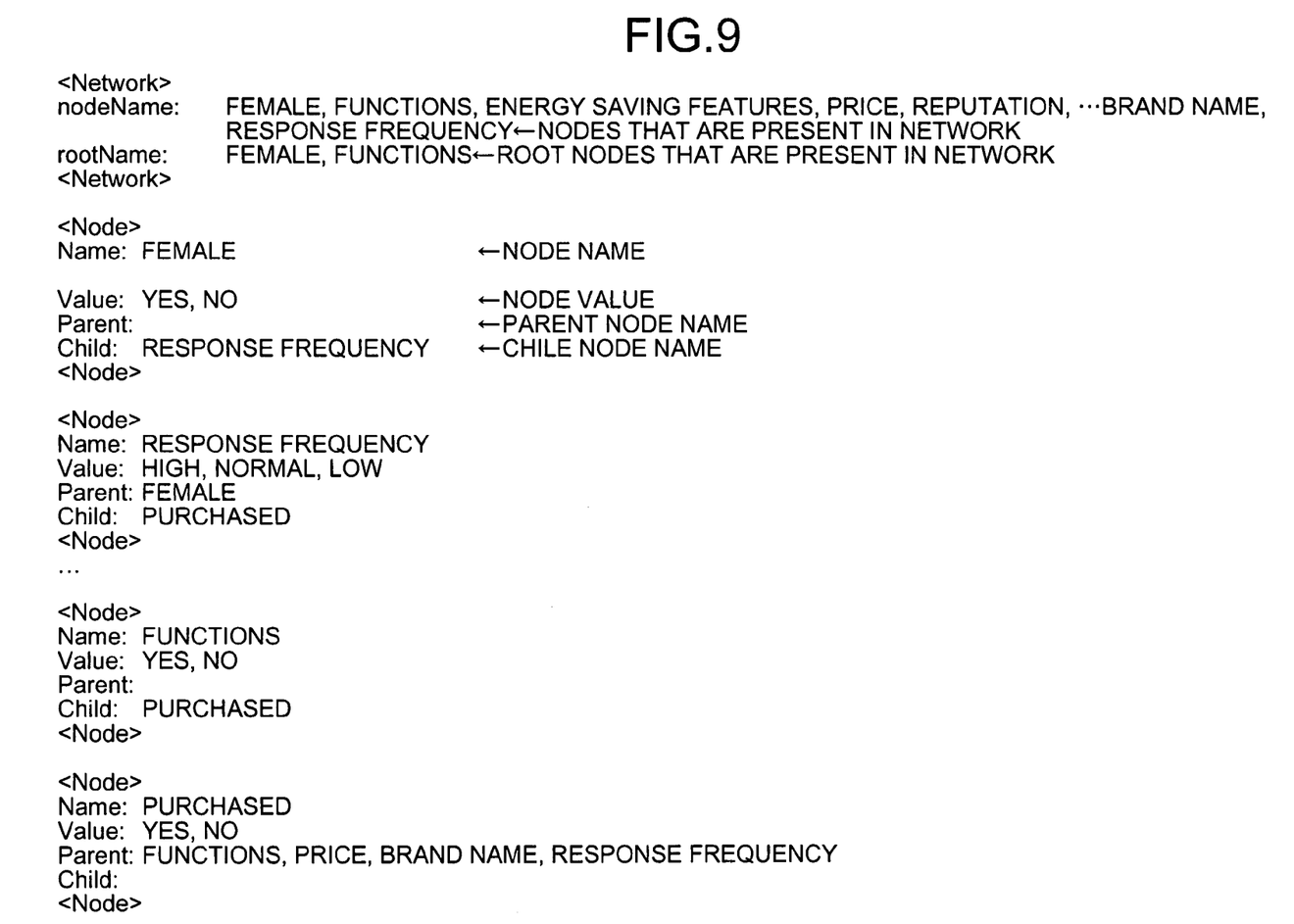
FIG. 9 is a schematic drawing of an analysis model generated for the questionnaire shown in FIG. 2.
Figure 10:
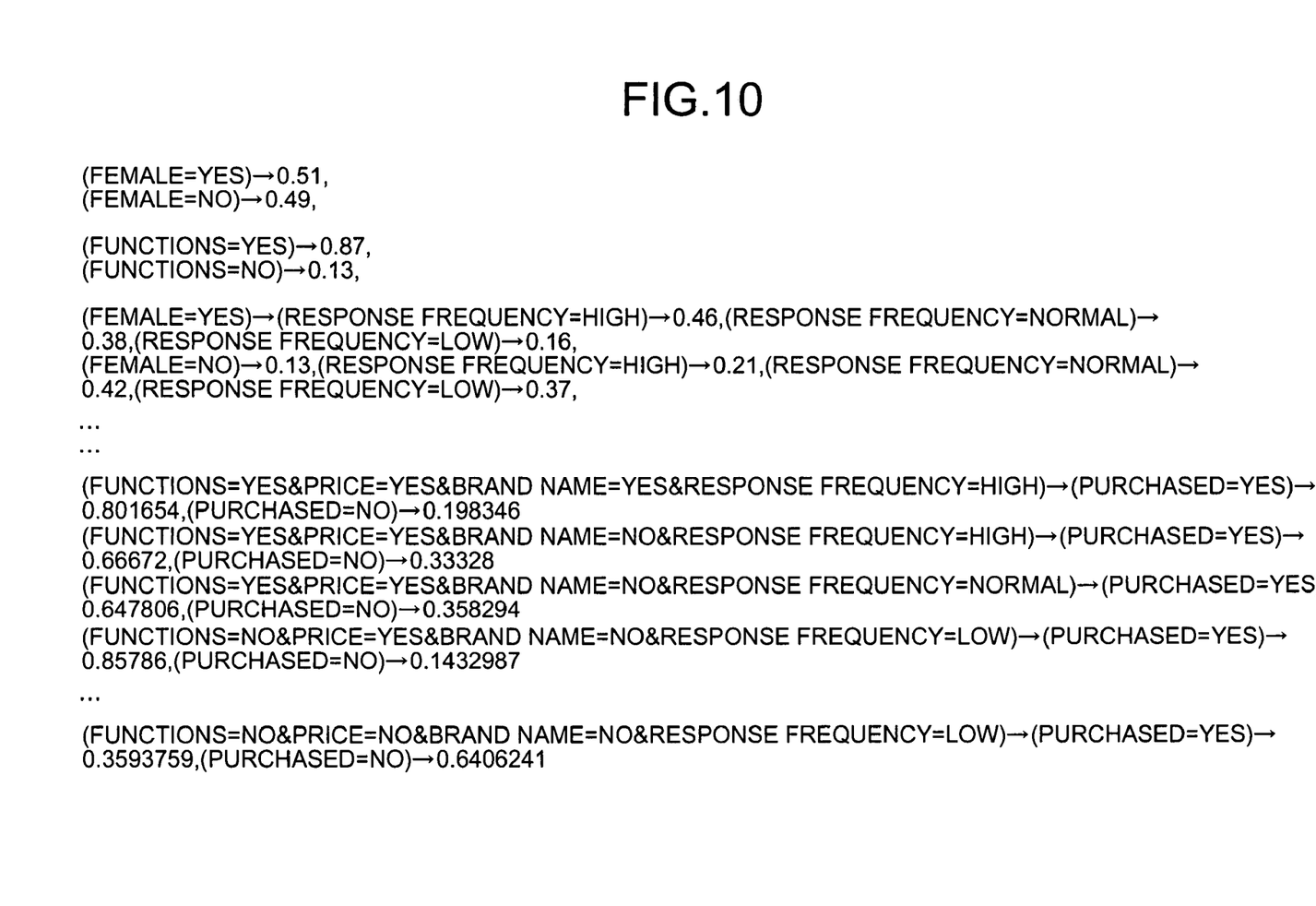
FIG. 10 is another schematic drawing of the analysis model generated for the questionnaire shown in FIG. 2.

As a result of the processing described above, the analysis model for the questionnaire shown in FIG. 2 is completed. FIG. 9 and FIG. 10 are schematic drawings of the analysis model generated for the questionnaire shown in FIG. 2. As shown in the drawing, the variables (i.e. the nodes) and the root nodes included in the analysis model are described. In addition for each of the nodes, the node name, the node value, the parent node name, and the child node name are defined. The node values of the variables that correspond to the option items for the question "Q2" are two variables, namely, "Yes" and "No". The node values of the aggregated variable are three variables, namely, "High", "Normal", and "Low". These values may be set in an arbitrary manner according to the analysis target. Further, as shown in FIG. 10, the variables and the numerical values indicating the causal relationships of the variables (i.e. conditional probability) are described.

As explained so far, when the analysis model generating apparatus 10 according to the present embodiment is used for generating an analysis model serving as a decision-making model of the respondents based on the questionnaire data, it is possible to construct an appropriate model by introducing all the factors that are important in the decision-making process without missing any information.

Figure 11:
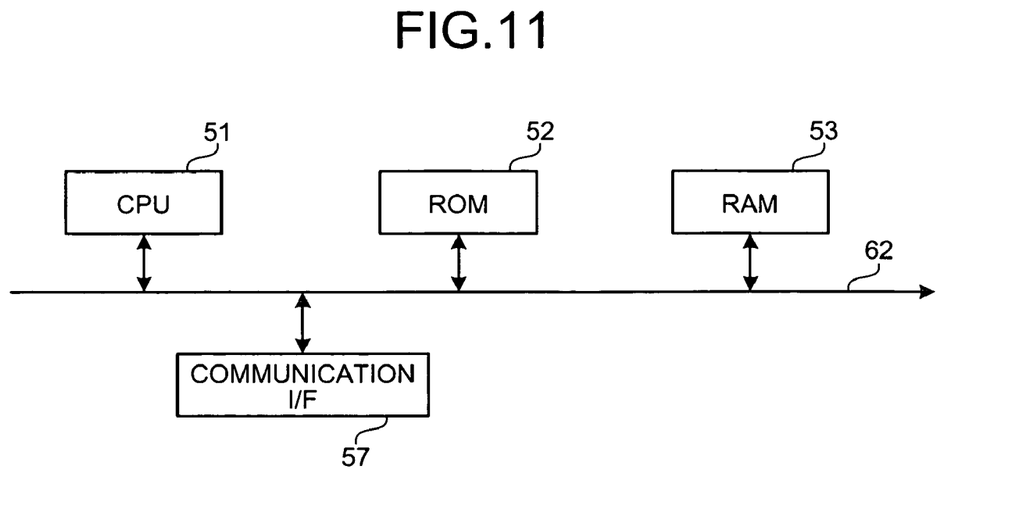
FIG. 11 is a drawing of a hardware configuration of the analysis model generating apparatus according to the embodiment.

FIG. 11 is a drawing of the hardware configuration of the analysis model generating apparatus 10 according to the embodiment. As the hardware configuration, the analysis model generating apparatus 10 includes a ROM 52 that stores therein an analysis model generating program that executes the analysis model generating process performed by the analysis model generating apparatus 10, a CPU 51 that controls the constituent elements of the analysis model generating apparatus 10 according to the program stored in the ROM 52, a RAM 53 that stores therein various types of data that are required in the control of the analysis model generating apparatus 10, a communication interface (I/F) 57 that connects to a network and performs communication, and a bus 62 that connects the constituent elements to one another.

The analysis model generating program used by the analysis model generating apparatus 10 may be provided as being recorded in a file that is in an installable format or in an executable format and being recorded on a computer-readable recording medium, such as a Compact Disc Read-Only Memory (CD-ROM), a floppy (R) Disk (FD), or a Digital Versatile Disk (DVD).

In such a situation, the analysis model generating program is loaded into a main storage device when being read from the recording medium and executed by the analysis model generating apparatus 10, so that the constituent elements explained above as the software configuration are generated in the main storage device.

Alternatively, it is acceptable to provide the analysis model generating program according to the present embodiment by storing the program into a computer connected to a network such as the Internet and allowing the program to be downloaded via the network.

As mentioned above, the present invention has been explained using the embodiment as an example, however, it is acceptable to apply various modifications and improvements to the embodiment.

A first example of such a modification is to generate an aggregated variable that includes not only the low causal parent variables but also other parent variables. According to the embodiment described above, the aggregated variable is generated by aggregating the low causal parent variables. For example, it is acceptable to use, as the aggregated variable, the number of items that are actually selected from among all the items for the question "Q2".

A second example of such a modification is to output an analysis model. According to the embodiment described above, the response data is evaluated, using the constructed analysis model. With this modification arrangement, it is possible to make evaluations, using the analysis model, also in other apparatuses.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An analysis model generating method for generating an analysis model in which causal relationships between variables are expressed using a Bayesian network, the method comprising:

selecting a child variable to be added to the analysis model;

selecting a plurality of variable candidates to be added to the analysis model as parent variables in causal relationships with the child variable;

judging, using a processor, whether each of values indicating the causal relationships between the selected variable candidates and the child variable are high causal variable candidates or low causal variable candidates, based on the causal relationships between the variable candidates and the child variable;

generating an aggregated variable different from the variable candidates by aggregating a plurality of low causal variable candidates, each of the low causal variable candidates being judged to have a low value in indicating the causal relationship;

generating the analysis model by putting a high causal variable candidate and the aggregated variable into the analysis model as the parent variables to the child variable, the high causal variable candidate being judged to have a high value in indicating the causal relationship; and evaluating target data by using the analysis model.

2. The analysis model generating method according to claim 1, wherein the variable candidates are selected based on information related to variables included in target data that is an analysis target to be analyzed by using the analysis model.

3. The analysis model generating method according to claim 2, wherein
the causal relationship between the variable candidate and the child variable are evaluated based on the information related to the variables included in the target data, and
the variable candidates are selected based on the evaluated causal relationships.

4. The analysis model generating method according to claim 1, wherein the variable candidates are selected based on a specification by a user.

5. The analysis model generating method according to claim 1, wherein
the aggregated variable is generated by aggregating the low causal variable candidate and the high causal variable candidate.

6. The analysis model generating method according to claim 1, wherein
each of all variables to be included in the analysis model is selected as the child variable, and
for each of all the child variables, selecting the variable candidates, generating the parent variables, and determining the parent variables are recursively repeated.

7. The analysis model generating method according to claim 6, wherein
the causal relationship between the child variable and the parent variable is changed into causal relationship between the aggregated variable and the parent variable, when parent variable to a child variable is determined, the child variable being one of the variable candidates aggregated into the aggregated variable.

8. A computer program product having a computer-readable medium including programmed instructions for performing an analysis model generating process to generate an analysis model in which causal relationships between variables are expressed using a Bayesian network, wherein the instructions, when executed by a computer, cause the computer to perform:
selecting a child variable to be added to the analysis model;
selecting a plurality of variable candidates to be added to the analysis model as parent variables in causal relationships with the child variable;
judging, using a processor, whether each of values indicating the causal relationships between the selected variable candidates and the child variable are high causal variable candidates or low causal variable candidates, based on the causal relationships between the variable candidates and the child variable;
generating an aggregated variable different from the variable candidates by aggregating a plurality of low causal variable candidates, each of the low causal variable candidates being judged to have a low value in indicating the causal relationship;
generating the analysis model by putting a high causal variable candidates and the aggregated variable into the analysis model as the parent variable to the child variable, the high causal variable candidate being judged to have a high value in indicating the causal relationship; and
evaluating target data by using the analysis model.

9. An analysis model-generating apparatus for generating an analysis model in which causal relationships between variables are expressed using a Bayesian network, the apparatus comprising:
a processor;
a child variable selecting unit that selects a child variable to be added to the analysis model;
a variable candidate selecting unit that selects a plurality of variable candidates to be added to the analysis model as parent variables in causal relationships with the child variable;
a causal relationship judging unit that judges whether each of values indicating the causal relationships between the selected variable candidates and the child variable are high causal variable candidates or low causal variable candidates, based on the causal relationships between the variable candidates and the child variable;
an aggregated variable generating unit that generates an aggregated variable different from the variable candidates by aggregating a plurality of low causal variable candidates, each of the low causal variable candidates being judged to have a low value in indicating the causal relationship; and
a constructing unit that generates the analysis model by putting a high causal variable candidate and the aggregated variable into the analysis model as the parent variables to the child variable, the high causal variable candidate being judged to have a high value in indicating the causal relationship; and
an evaluating unit that evaluates target data by using the analysis model.

* * * * *